United States Patent
Rogers

(10) Patent No.: US 6,718,405 B2
(45) Date of Patent: Apr. 6, 2004

(54) HARDWARE CHAIN PULL

(75) Inventor: Jeffrey M. Rogers, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 245 days.

(21) Appl. No.: 09/957,106

(22) Filed: Sep. 20, 2001

(65) Prior Publication Data

US 2003/0056037 A1 Mar. 20, 2003

(51) Int. Cl.[7] .............................................. G06F 13/28
(52) U.S. Cl. .............................. 710/22; 710/24; 710/35; 710/52; 710/308; 710/310
(58) Field of Search ............................. 710/20, 22, 24, 710/35, 52, 308, 310

(56) References Cited

U.S. PATENT DOCUMENTS

| | | | |
|---|---|---|---|
| 5,701,516 A | * 12/1997 | Cheng et al. ................. | 710/22 |
| 6,145,045 A | * 11/2000 | Falik et al. .................. | 710/310 |
| 6,298,391 B1 | * 10/2001 | Kennedy et al. ............. | 709/328 |
| 6,360,219 B1 | * 3/2002 | Bretl et al. .................... | 707/8 |
| 6,404,428 B1 | * 6/2002 | Radecki et al. ............. | 345/419 |

* cited by examiner

Primary Examiner—Rehana Perveen
(74) Attorney, Agent, or Firm—Christopher P. Maiorana, P.C.

(57) ABSTRACT

A controller generally comprising a DMA engine, a processor, and a circuit. The DMA engine may be configured to copy from a system memory to a local memory. The processor may be configured to process a message written in the local memory. The circuit may operate independently of the processor. The circuit may be configured to (i) monitor writes to the local memory for the message having a first pointer and (ii) program the DMA engine to copy a first buffer identified by the first pointer in response to the first pointer having a non-null value.

20 Claims, 4 Drawing Sheets

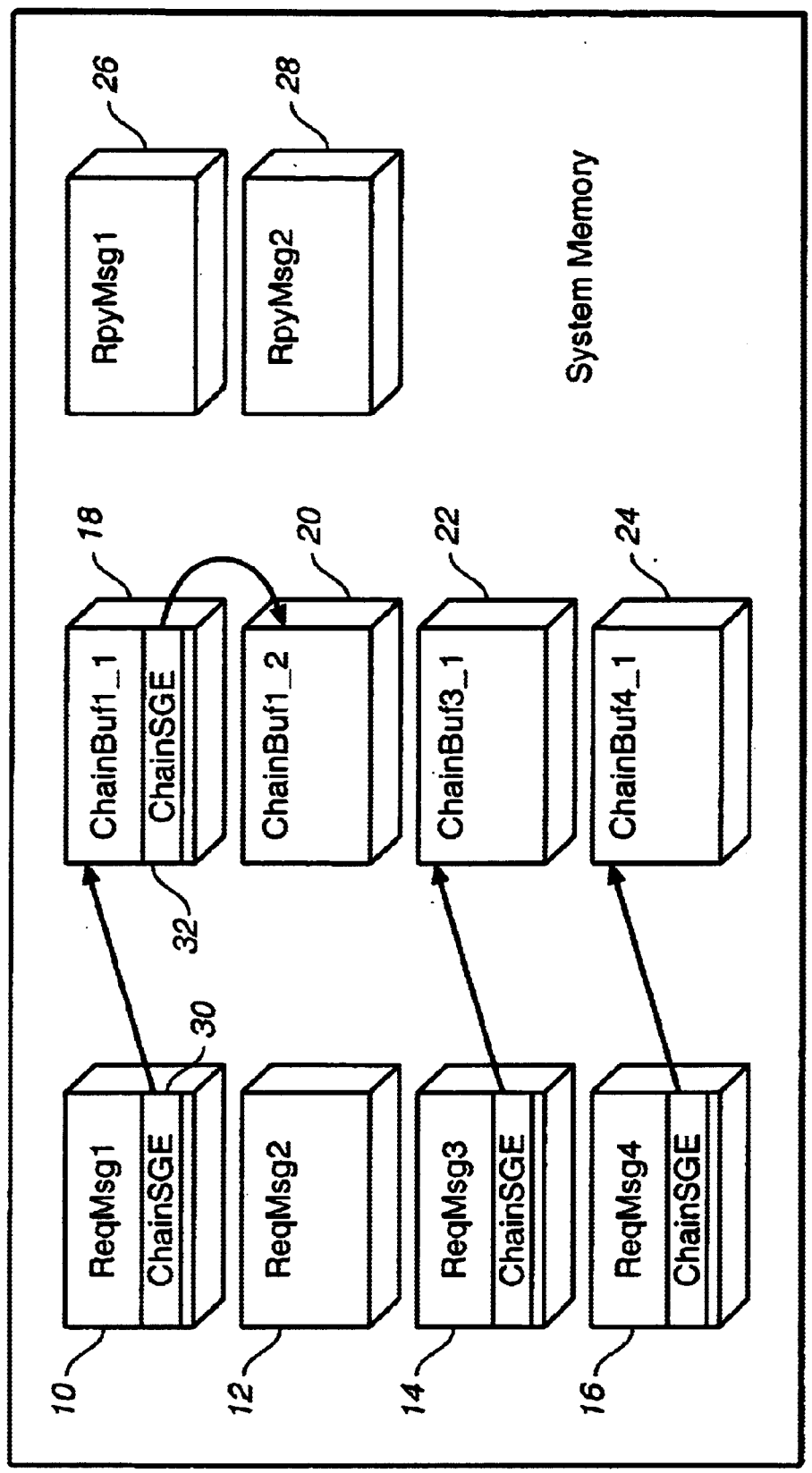
FIG._1

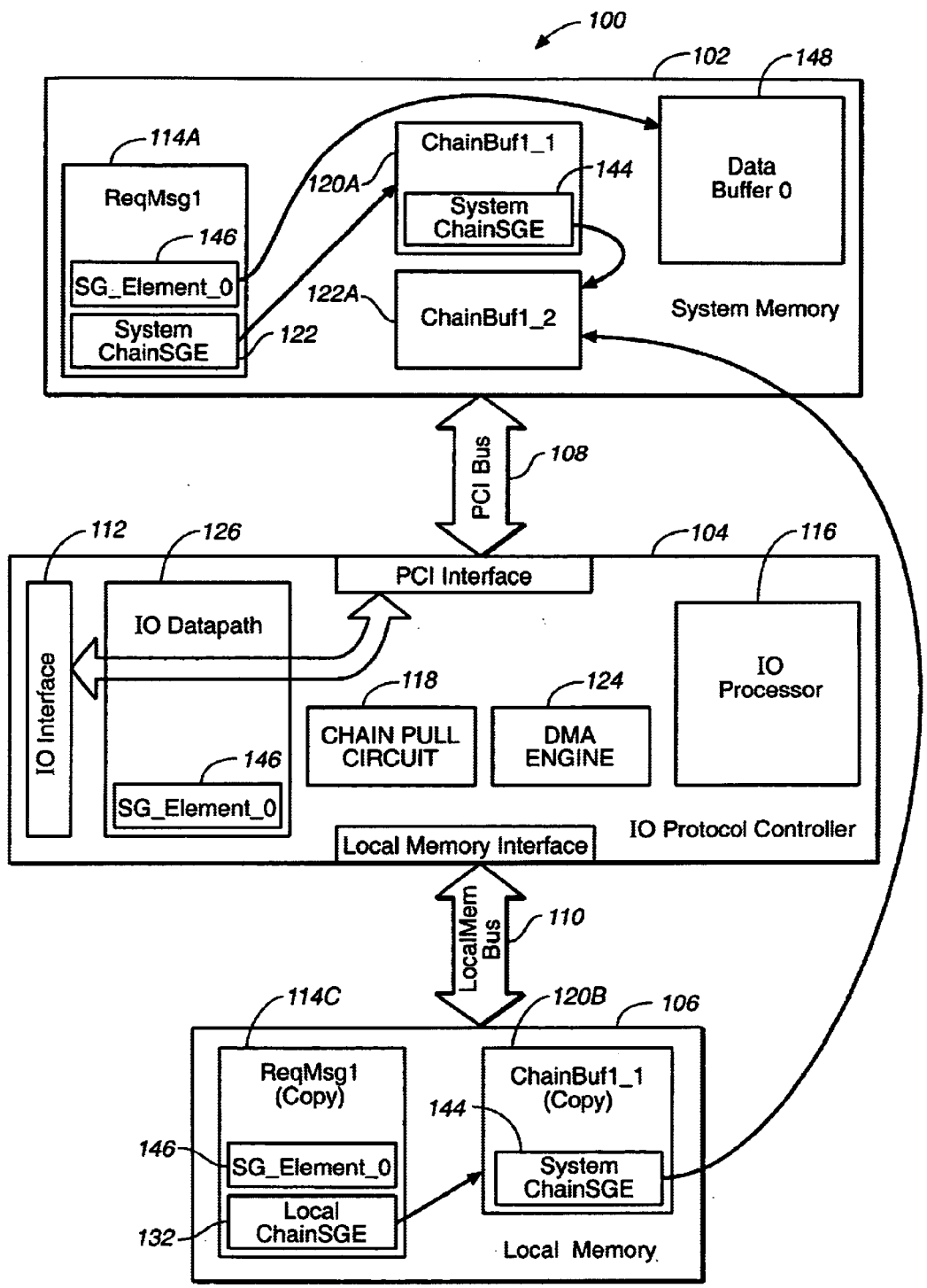
FIG._2

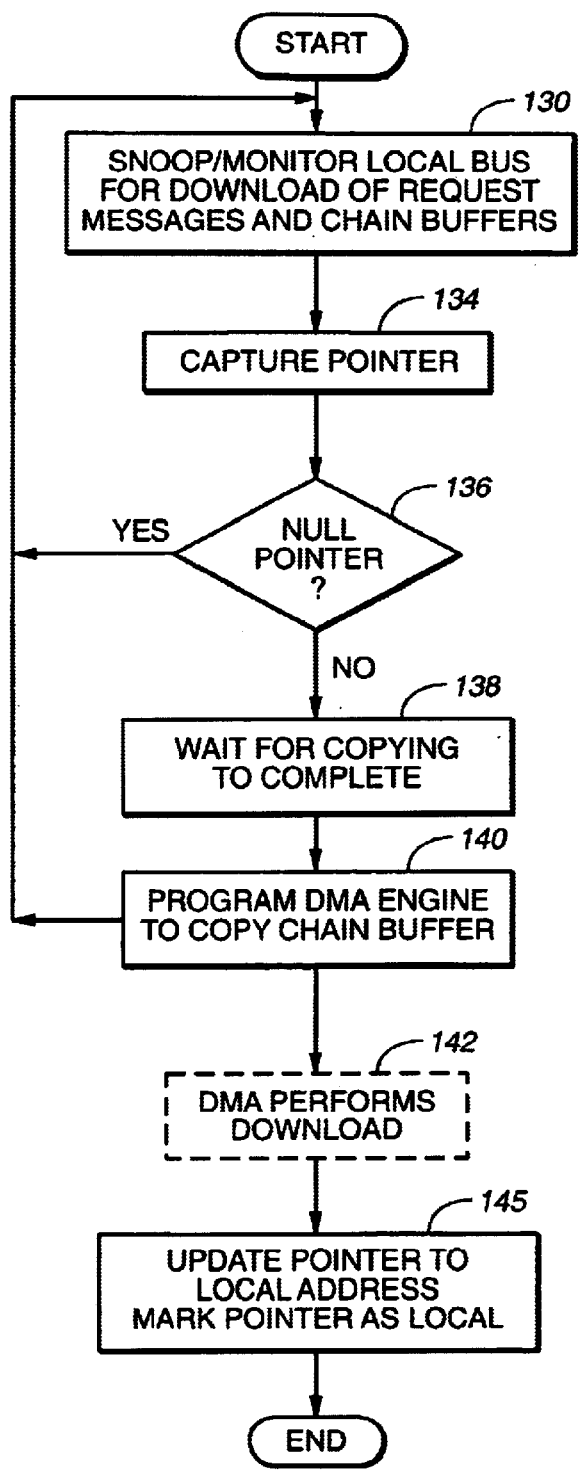
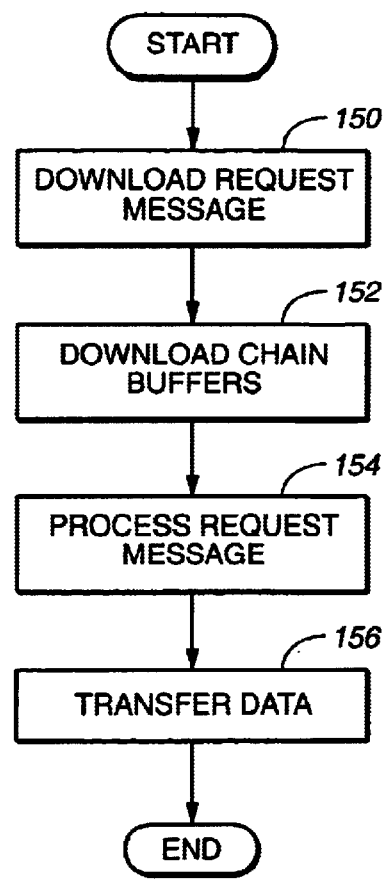
FIG._3
FIG._4

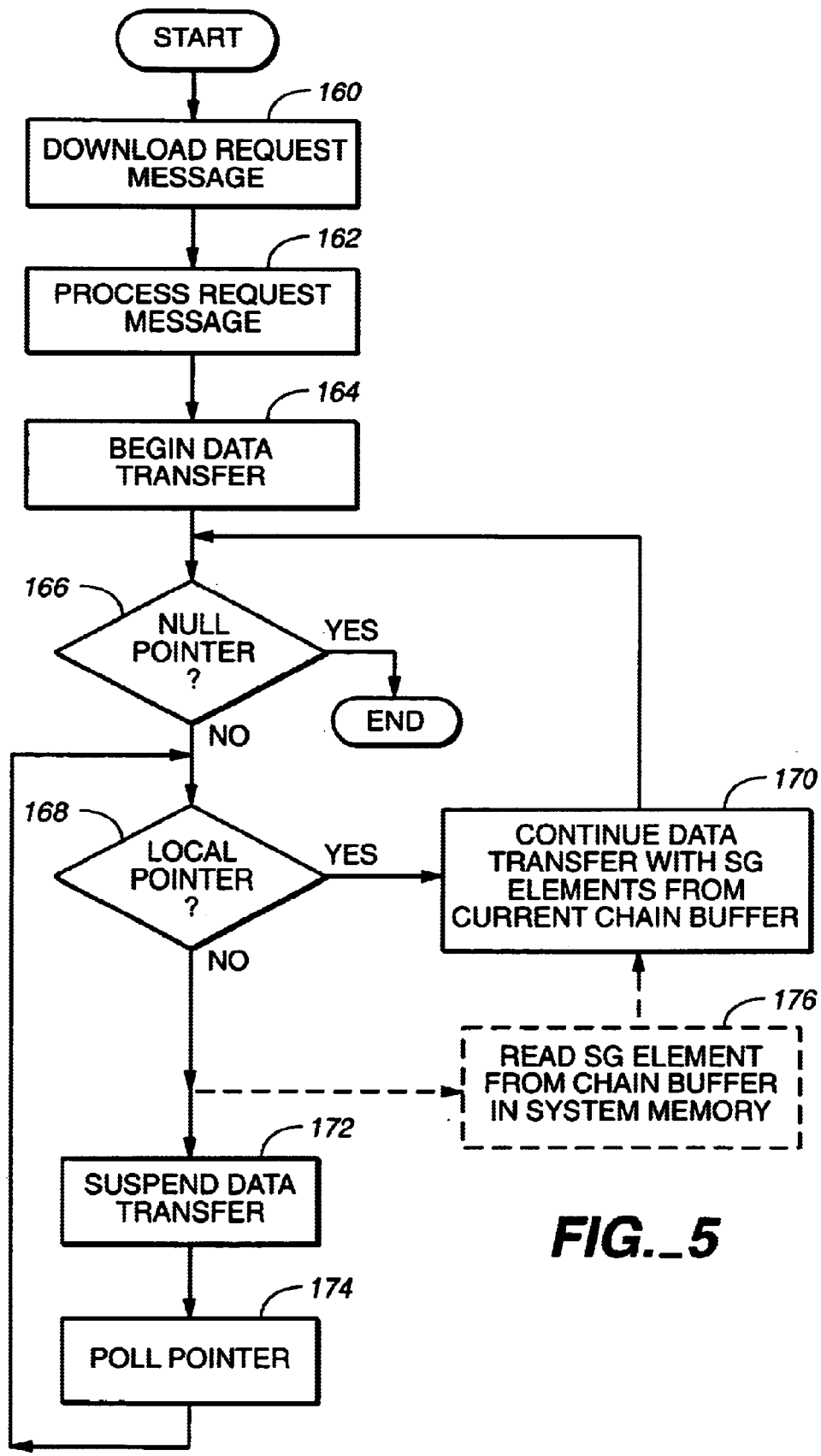
FIG._5

HARDWARE CHAIN PULL

FIELD OF THE INVENTION

The present invention relates to a method and/or architecture for input/output processing generally and, more particularly, to copying chain buffers from a system memory to a local memory to accommodate large scatter-gather lists.

BACKGROUND OF THE INVENTION

Conventional computers perform input/output (I/O) processing by building request messages in a host or system memory. The messages are then sent to an intelligent I/O protocol controller that performs the actual I/O data transfers. The I/O data transfers are commonly made more efficient by implementing small block I/O messages. As a result, some request messages cannot contain all of the data to be transferred.

A request message may have an associated scatter-gather (SG) list to permit the request message to transfer one or more buffers of data. The SG list is conventionally stored in one or more chain buffers linked to the request message if the SG list does not fit into the request message. Each chain buffer is a SG segment. Each SG segment contains one or more SG elements. Each SG element points to a data buffer in the system memory containing the data to be transferred. A SG element may contain an address and a length of the data buffer. An I/O protocol controller has two options in the event that chain buffers are required for an I/O operation. The I/O protocol controller may control direct memory access (DMA) operations based on the SG elements stored in the system memory. Alternatively, the I/O protocol controller may copy the entire chain buffer(s) into a local memory and execute DMA operations based on the copy.

Referring to FIG. 1, a depiction of request messages 10, 12, 14 and 16, associated chain buffers 18, 20, 22 and 24, and reply messages 26 and 28 is illustrated. The request messages 10, 14 and 16 may require use of chain buffers 18–24, while the request message 12 may not. If the request message 10 requires a chain buffer, then the request message 10 will contain a pointer 30 that identifies a particular chain buffer 18. The chain buffer 18 is shown having another pointer 32 that links the chain buffer 18 to the chain buffer 20.

Conventional I/O protocol controllers operate on a single SG element at a time. A conventional chain buffer can easily accommodate up to ten simple SG elements. To access a SG element within a chain buffer residing in the system memory, the I/O protocol controller must incur a latency associated with accessing data across a shared system bus. Furthermore, each access to a SG element reduces an available bandwidth of the shared bus, reducing overall system performance.

To reduce the shared system bus utilization and reduce the latency associated with accessing the SG elements, entire chain buffers can be copied to the local memory using a single DMA operation. Copying the entire chain buffer is desirable because the shared system bus utilization is more efficient (i.e., approximately ten SG elements can be bursted into the local memory using a single shared system bus transaction) and subsequent SG element access latency is reduced. However, copying the chain buffers to the local memory introduces new issues. First, the DMA operation is typically controlled via an on-chip I/O processor. The copy task reduces the bandwidth that the I/O processor has available for other operations. Secondly, the I/O operation involving the chain buffers cannot be initiated until the chain buffers have been copied locally.

SUMMARY OF THE INVENTION

The present invention concerns a controller generally comprising a DMA engine, a processor, and a circuit. The DMA engine may be configured to copy from a system memory to a local memory. The processor may be configured to process a message written in the local memory. The circuit may operate independently of the processor. The circuit may be configured to (i) monitor writes to the local memory for the message having a first pointer and (ii) program the DMA engine to copy a first buffer identified by the first pointer in response to the first pointer having a non-null value.

The objects, features and advantages of the present invention include providing a circuit to direct copying of chain buffers to a local memory that may (i) save work required of an I/O processor, (ii) permit I/O processing to start before all of the chain buffers are copied and/or (iii) permit I/O data transfers to start before all of the chain buffers are copied.

BRIEF DESCRIPTION OF THE DRAWINGS

These and other objects, features and advantages of the present invention will be apparent from the following detailed description and the appended claims and drawings in which:

FIG. 1 is a block diagram showing conventional request messages with chain buffers;

FIG. 2 is a block diagram of a system implementing the present invention;

FIG. 3 is a flow diagram of a method for copying information between a system memory and a local memory;

FIG. 4 is a flow diagram of a data transfer method; and

FIG. 5 is a flow diagram of another data transfer method.

DETAILED DESCRIPTION OF THE PREFERRED EMBODIMENTS

Referring to FIG. 2, a block diagram of a system 100 is shown in accordance with a preferred embodiment of the present invention. The system 100 is generally implemented as a computer system. The computer system 100 may comprise a circuit 102, a circuit 104, and a circuit 106. The circuit 102 and the circuit 104 may be coupled through a bus 108. The circuit 104 and the circuit 106 may be coupled through another bus 110.

The circuit 102 may be implemented as a system memory. The system memory 102 is generally the main memory or host memory of the computer system 100. The system memory 102 may store a variety of information including, but no limited to, one or more request messages, one or more chain buffers, and/or one or more data buffers.

The circuit 104 may be implemented as an I/O protocol controller card or module. The I/O protocol controller 104 may have an I/O interface 112 used to communicate data transfers. The data transfers may be exchanges with other circuits (not shown) within the computer system 100 and/or external to the computer system 100. The I/O protocol controller 104 is generally configured to transfer data to and from the system memory 102 and the I/O interface 112.

The I/O protocol controller 104 may access the system memory 102 via the bus 108. The bus 108 is generally a shared system bus of the computer system 100. The bus 108 may be implemented according to the Peripheral Component Interconnect (PCI) bus standard, the Versa Module Europa (VME) bus standard, or the like. Other bus standards may be implemented to meet the design criteria of a particular application.

The circuit 106 may be implemented as a local memory. The local memory 106 generally stores request messages and chain buffers copied from the system memory 102 as well as other information. The local memory 106 may be coupled to the I/O protocol controller 104 through the bus 110. The bus 110 is generally a circuit board-level dedicated bus. The local bus 110 may provide for rapid data exchanges between the local memory 106 and the circuitry of the I/O protocol controller 104. Other variations of the local bus 110 may be implemented to meet the design criteria of a particular application.

The present invention is generally applicable to any I/O protocol controller 104 that utilizes chain buffers to accommodate SG segments and SG elements that may not fit into the associated request messages. The I/O protocol controller 104 may copy a request message 114A from system memory 102 to the local memory 106. The task of copying the request message 114A may be accomplished with an embedded I/O processor 116 or dedicated hardware (not shown). Once a local request message copy 114B of the request message 114A is available, the I/O protocol-dependent work based on the request message copy 114B may be performed via the I/O processor 116. A circuit 118 may allow the I/O processor 116 to begin the I/O protocol-dependent work on the request message copy 114B immediately, regardless of the existence of associated chain buffers 120A and 122A. Furthermore, the I/O protocol controller 104 may optionally be configured to allow I/O data transfers to begin prior to completion of the chain buffer copy, further reducing I/O latency.

The I/O protocol controller 104 generally comprises the I/O interface 112, the I/O processor 116, the circuit 118, a circuit 124, and a circuit 126. The circuit 118 may be implemented as a chain pull circuit. Operations of the chain pull circuit 118 may be described in more detail below. The circuit 124 may be implemented as a direct memory access (DMA) engine. The circuit 126 may be implemented as a datapath. The DMA engine 124 may be configured to transfer information between the system memory 102 and the local memory 106 and between the system memory 102 and the datapath 126. The datapath 126 may be configured to exchange data through the I/O interface 112.

Referring to FIG. 3, a flow diagram of a method for operating the chain pull circuit 118 is shown. The chain pull circuit 118 generally snoops the local bus 110 watching for operations involving request messages (e.g., block 130). When downloading of a request message (e.g., the request message 114A of FIG. 2) is detected, the chain pull circuit 118 may capture a pointer 132 within the request message 114A that identifies the first chain buffer 120A (e.g., block 134). The pointer 132 may identify the first chain buffer 120A with an address value and an indicator value that associates the address value with the system memory 106.

The chain pull circuit 118 may check if the pointer 132 has a null value or an end of chain indicator (e.g., decision block 136). If the pointer 132 has the null value/end of chain indicator (e.g., the YES branch of decision block 136), then the request message 114A does not have any associated chain buffers. Therefore, the chain pull circuit 118 may continue monitoring the local bus 106 (e.g., block 130) for additional request messages. If the pointer 132 has a non-null value or a chain continues indicator (e.g., the NO branch of decision block 136), then the chain pull circuit 118 may wait for copying of the request message 114A into the local memory 106 to complete (e.g., block 138).

When the copying of the request message to the local memory 106 completes, the chain pull circuit 118 may program the DMA engine 124 to initiate a DMA operation (e.g., block 140). The DMA operation may copy the first chain buffer 120A into the local memory 106 (e.g., block 142). During the DMA operation, the chain pull circuit 118 may again snoop the local bus 110 (e.g., block 130) to determine if the incoming first chain buffer 120A contains a reference to an additional chain buffer (e.g., the second chain buffer 122A in FIG. 2). If the chain pull circuit 118 detects a chain buffer pointer 144 in the first chain buffer 120A, then an address of the pointer 144 may be captured (e.g., block 134).

The pointer 144 may be examined by the chain pull circuit 118 to determine if the pointer 144 has the null value/end of chain indicator (e.g., decision block 136). If the pointer 144 has the null value/end of chain indicator (e.g., the YES branch of decision block 136), then the chain pull circuit 118 may continue to monitor the local bus 110 for additional request messages and/or chain buffers. If the pointer 144 has the non-null value/chain continues indicator (e.g., the NO branch of decision block 136), then the chain pull circuit 118 may wait for the copying of the first chain buffer 120A to the local memory 106 to complete (e.g., block 138).

The chain pull circuit 118 may program the DMA engine 124 to download the second chain buffer 122A identified by the pointer 144 (e.g., block 140). The process of monitoring the local bus 110, capturing pointers from a current chain buffer being copied, checking for non-null/chain continues pointers, and programming the DMA engine 124 to download the next chain buffer may continue until a null pointer or end of chain indicator is found. The null pointer/end of chain indicator may indicate that the current chain buffer being downloaded to the local memory 106 is a last chain buffer associated with the request message.

Returning to block 142, once downloading of the current chain buffer to the local memory 106 has completed, the chain pull circuit 118 may update the pointer of a request message/chain buffer previously downloaded (e.g., block 145). For example, once the download of the first chain buffer 120A has completed, the chain pull circuit 118 may update the pointer 132 in the request message copy 144B. The pointer update generally changes the address within the pointer 132 from a system memory address to a local memory address. The local memory address generally addresses or identifies the just downloaded current chain buffer (e.g., from the chain buffer copy 120B) as stored in the local memory 106.

The chain pull circuit 118 may also mark the pointer 132 as a local pointer (e.g., block 145). For example, the request message 114A stored in the system memory 102 may have the pointer 132 to the first chain buffer 120A marked as a system pointer. When the request message 114A is copied to the local memory 106, the pointer 132 may still be marked as a system pointer and may still contain the system address of the chain buffer 120A. However, once the first chain buffer copy 120B has been stored in the local memory 106, the pointer 132 may be changed to point to the first chain buffer copy 120B in the local memory 106 instead of the first chain buffer 120A in the system memory. Note that the pointer 144 of the first chain buffer copy 120B may still be marked as a system type pointer and may contain the system memory address of the second chain buffer 122A.

The chain pull circuit 118 generally reduces the amount of work required of the I/O processor 116 in order to begin an I/O operation. Additionally, the I/O protocol controller 104 may be configured to post the downloaded request message to the I/O processor 116 either (i) immediately upon download completion of the request message or (ii) only after all of the chain buffers have also been downloaded.

In situations where the I/O protocol controller 104 is configured to post the request message immediately, the I/O data transfers may begin prior to completion of downloading the chain buffers. For example, the I/O datapath 126 may begin DMA operations using a SG element (e.g., SG_ELEMENT_0 in box 146) found in the request message copy 114B. The pointer SG_ELEMENT_O may identify a data buffer 148 stored in the system memory 102. The data buffer 148 may contain data to be presented by the I/O datapath 126 through the I/O interface 112. Alternatively, the data buffer 148 may be a location to store data received through the I/O interface 112 by the I/O datapath 126. Once data transfers for the data buffer 148 are finished, the I/O datapath 126 may continue with other data buffers (not shown) identified by SG elements stored in the first chain buffer copy 120B. If the pointer 132 is marked as a local type of pointer, then the I/O datapath 126 may conclude that the first chain buffer copy 120B may be valid and ready for use.

Referring to FIG. 4, a flow diagram of a method for performing a data transfer is shown. The method may start with the downloading of a request message to the local memory 106 (e.g., block 150). The chain pull circuit 118 may then instruct the DMA engine 124 to download the chain buffers associated with the request message as described in FIG. 3 (e.g., block 152). After all of the chain buffers have been copied to the local memory 106, the I/O processor 116 may being working on protocol-dependencies of the request message (e.g., block 154). The I/O datapath 126 then generally performs the data transfer as defined by the request message (e.g., block 156).

Referring to FIG. 5, a flow diagram of another method of performing a data transfer is shown. The method generally begins with the downloading of a request message to the local memory 106 (e.g., block 160). After the request message has been copied, but before all of the chain buffers have been copied to the local memory 106, the I/O processor 116 may being working on protocol-dependencies of the request message (e.g., block 162). Likewise, once the request message has been copied to the local memory 106, the I/O datapath 126 may being the data transfer using the information and the pointer SG_ELEMENT_0 within the request message copy 114B (e.g., block 164).

Once the I/O datapath 126 has performed as much of the data transfer as possible using just the request message copy, the pointer of the request message copy may be checked for additional chain buffers (e.g., decision block 166). If the pointer has the null value/end of chain indicator (e.g., the YES branch of decision block 166), then there are no chain buffers to process and the data transfer may be completed. If the pointer has the non-null value/chain continues indicator (e.g., the NO branch of decision block 166), then the pointer type may be checked (e.g., decision block 168).

If the pointer is a local pointer, then the first chain buffer copy has already been copied into the local memory 106. Therefore, the I/O datapath 126 may continue the data transfer using the SG segments and SG elements found in the chain buffer copy (e.g., block 170). Upon completing the data transfers defined in the first chain buffer copy, the pointer of the first chain buffer copy may be checked for the null value/end of chain indicator (e.g., decision block 166). The data transfer may be continued using successive current chain buffer copies from the local memory 106 until the last chain buffer copy has a pointer with the null value/end of chain indicator (e.g., the YES branch of decision block 166).

If the pointer of the request message copy or any subsequent chain buffer copy is a system pointer, then the I/O datapath 126 may suspend the data transfer for lack of the next SG element in the local memory 106 (e.g., block 172). The I/O datapath may wait while polling the pointer of the request message copy or the current chain buffer copy (e.g., block 174). When the chain pull circuit 118 marks the pointer as a local pointer (e.g., block 144 from FIG. 3), then next chain buffer copy is generally available for use in the local memory 106. The I/O datapath 126 may then recognize the pointer as local (e.g., the YES branch of decision block 168) and then continue the data transfer operation (e.g., block 170).

In one embodiment of the data transfer process, the I/O datapath 126 may not suspend the data transfer when the pointer is not local per the NO branch of decision block 168. The I/O datapath 126 may use the system pointer to locate the next chain buffer in the system memory 102. The I/O datapath 126 may therefore read the next SG element from the next chain buffer as stored in the system memory 102 (e.g., block 176). With the next SG element in hand, the I/O datapath 126 may continue the data transfer (e.g., block 170).

Returning to FIG. 2, an example illustration of a data transfer initiated before the last chain buffer is downloaded is shown. The DMA operations to fetch the data buffer 148 may be initiated via the I/O datapath 126 using the pointer SG_ELEMENT_0 from the request message copy 114B. In the example, the first chain buffer copy 120B may be completely downloaded into the local memory 106 but the second chain buffer 122A may not. When the I/O datapath 126 completes the DMA associated with pointer SG_ELEMENT_0, then the I/O datapath 126 may continue with the SG elements contained in the first chain buffer copy 120B, because the first chain buffer copy 120B is readily available for use in the local memory 106. If the I/O datapath 126 exhausts all of the SG elements within the first chain buffer copy 120B before the second chain buffer 122A has been downloaded to the local memory 106, then the I/O datapath 126 generally polls the pointer 144 in the first chain buffer copy 120B. Polling may continue until the pointer 144 becomes type local (indicating that the second chain buffer 122A has completed downloading). Alternatively, the I/O datapath 126 may follow the pointer 144 (type system) to the SG elements found in the second chain buffer 122A in the system memory 102. Either process generally illustrates how I/O latency for the data transfer may be reduced via the chain pull circuit 118.

The chain pull circuit 118 may be implemented as a hardware-only design (e.g., a hardware chain pull). The hardware chain pull 118 may be embedded as part of the DMA engine 124 or a separate circuit (as shown in FIG. 2). In other embodiments, the chain pull circuit 118 may be implemented as software, firmware, or microcode executed on a microprocessor and/or in combination with dedicated hardware. It is desirable, however, that the chain pull circuit 118 operate outside of and independently from the I/O processor 116. Independence between the I/O processor 116 and the chain pull circuit 118 generally frees the I/O processor 116 to perform other tasks while the chain pull circuit 118 is directing the chain buffer downloads.

While the invention has been particularly shown and described with reference to the preferred embodiments thereof, it will be understood by those skilled in the art that various changes in form and details may be made without departing from the spirit and scope of the invention.

What is claimed is:

1. A controller comprising:
   a DMA engine configured to copy from a system memory to a local memory;
   a processor configured to process a message written in said local memory; and
   a circuit operating independently of said processor and configured to (i) monitor writes to said local memory for said message having a first pointer and (ii) program said DMA engine to copy a first buffer identified by said first pointer in response to said first pointer having a non-null value.

2. The controller according to claim 1, wherein said circuit is further configured to update said first pointer to an address of said first buffer in said local memory.

3. The controller according to claim 1, wherein said circuit is further configured to (a) monitor writes to said local memory for said first buffer having a second pointer and (b) program said DMA engine to copy a second buffer identified by said second pointer in response to said second pointer having said non-null value.

4. The controller according to claim 3, wherein said circuit is further configured to update said second pointer to an address of said second buffer in said local memory.

5. The controller according to claim 1, wherein said processor is configured to initiate processing of said message prior to said DMA engine copying a last buffer to said local memory.

6. The controller according to claim 1, further comprising a datapath configured to perform data transfers associated with said message.

7. The controller according to claim 6, wherein said datapath is further configured to initiate said data transfers prior to said DMA engine copying a last buffer to said local memory.

8. The controller according to claim 6, wherein said datapath is further configured to suspend said data transfers until a current buffer required for said data transfers is copied to said local memory.

9. The controller according to claim 6, wherein said datapath is further configured to continue said data transfers using a current buffer stored in said system memory.

10. The controller according to claim 1, wherein:
    said circuit is further configured to (a) update said first pointer to a first address of said first buffer in said local memory, (b) mark said first pointer as a local pointer in response to updating said first pointer, (c) monitor writes to said local memory for said first buffer having a second pointer, (d) program said DMA engine to copy a second buffer identified by said second pointer in response to said second pointer having said non-null value, (e) update said second pointer to a second address of said second buffer in said local memory and (f) mark said second pointer as said local pointer in response to updating said second pointer; and
    said processor is further configured to initiate processing of said message prior to said DMA engine copying a last buffer to said local memory.

11. A method of operating a controller comprising the steps of:
    (A) monitoring writes to a local memory for a message having a first pointer;
    (B) processing said message; and
    (C) copying a first buffer identified by said first pointer from a system memory to said local memory in response to said first pointer having a non-null value, said copying operating independently of said processing.

12. The method according to claim 11, further comprising the step of updating said first pointer to an address of said first buffer in said local memory.

13. The method according to claim 11, further comprising the steps of:
    monitoring writes to said local memory for said first buffer having a second pointer; and
    copying a second buffer identified by said second pointer from said system memory to said local memory in response to said second pointer having said non-null value.

14. The method according to claim 13, further comprising the step of updating said second pointer to an address of said second buffer in said local memory.

15. The method according to claim 11, further comprising the step of initiating processing of said message prior to completing copying of a last buffer to said local memory.

16. The method according to claim 11, further comprising the step of performing data transfers associated with said message in response to processing said message.

17. The method according to claim 16, further comprising the step of initiating said data transfers prior to copying a last buffer to said local memory.

18. The method according to claim 16, further comprising the step of suspending said data transfers until a current buffer required for said data transfers is copied to said local memory.

19. The method according to claim 16, further comprising the step of continuing said data transfers using a current buffer stored in said system memory prior to copying said current buffer to said local memory.

20. A controller comprising:
    means for monitoring writes to a local memory for a message having a first pointer;
    means for processing said message; and
    means for copying a first buffer identified by said first pointer from a system memory to said local memory in response to said first pointer having a non-null value, said means for copying operating independently of said means for processing.

* * * * *